United States Patent [19]

Perry

[11] 4,210,774
[45] Jul. 1, 1980

[54] FILLED POLYMER ELECTRICAL INSULATOR

[75] Inventor: Elijah R. Perry, Portola Valley, Calif.

[73] Assignee: Electric Power Research Institute, Inc., Palo Alto, Calif.

[21] Appl. No.: 807,163

[22] Filed: Jun. 16, 1977

[51] Int. Cl.² ............................................. H01B 3/12
[52] U.S. Cl. ......................... 174/140 R; 174/DIG. 1; 174/110 SR
[58] Field of Search ............. 174/110 SR, 116, 140 R, 174/DIG. 1

[56] References Cited

U.S. PATENT DOCUMENTS

| | | | |
|---|---|---|---|
| 2,325,416 | 7/1943 | McMahon | 174/DIG. 1 |
| 2,768,264 | 10/1956 | Jones | 174/DIG. 1 |
| 2,772,334 | 11/1956 | Latour | 174/DIG. 1 |
| 2,879,323 | 3/1959 | Nichols | 174/140 R |
| 3,242,257 | 3/1966 | Jones | 174/DIG. 1 |
| 3,324,223 | 6/1967 | Bollmeier | 174/140 R |
| 3,433,893 | 3/1969 | Hofman | 174/DIG. 1 |
| 3,475,546 | 10/1969 | Sadler | 174/DIG. 1 |
| 3,674,519 | 7/1972 | Higuchi | 174/140 R |
| 3,831,399 | 8/1974 | Majkrak | 174/DIG. 1 |
| 4,001,128 | 1/1977 | Penneck | 174/DIG. 1 |

FOREIGN PATENT DOCUMENTS 666517 7/1963 Canada ............................... 174/DIG. 1

OTHER PUBLICATIONS

Sterling, R. F., Arc-Resistant Molding Materials and Finishes, AIEE Transactions, Jan. 1957, pp. 776-778.

Primary Examiner—Richard R. Kucia
Attorney, Agent, or Firm—Flehr, Hohbach, Test, Albritton & Herbert

[57] ABSTRACT

An electrical insulation body formed of a polymer binder highly filled with electrically non-conductive inorganic inert filler particles, including in excess of 85% of such particles. Such high loading is facilitated by grading the particles in nonhomogeneous sizes including relatively large ones and by use of polymer binders of relatively low viscosity.

12 Claims, 5 Drawing Figures

U.S. Patent         Jul. 1, 1980         4,210,774
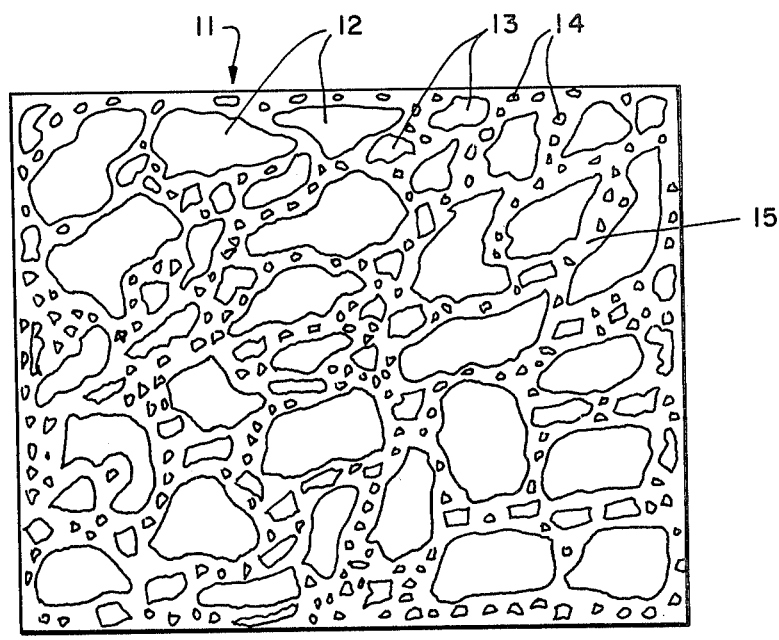
FIG.—1
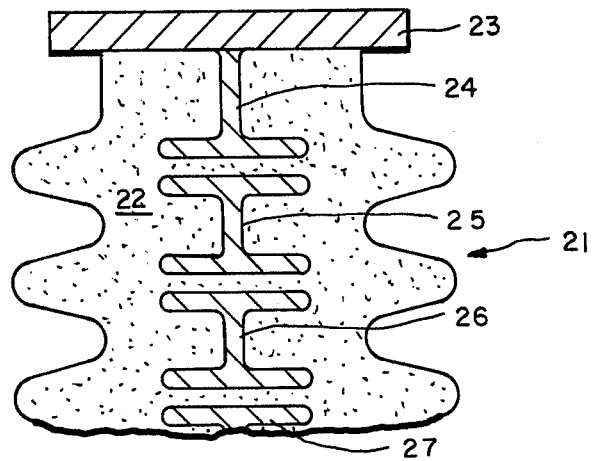
FIG.—2
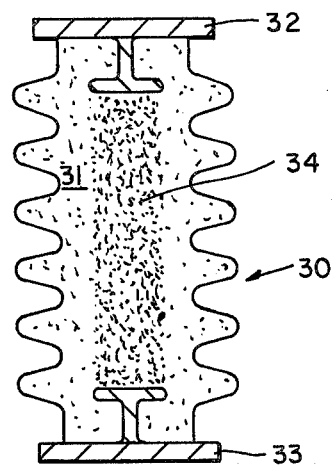
FIG.—3
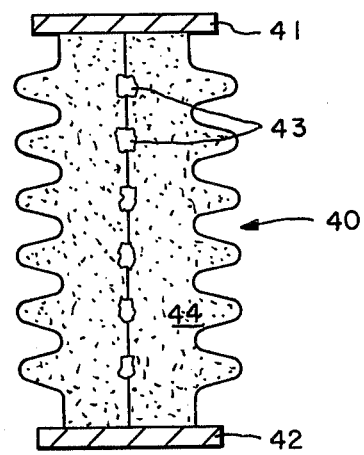
FIG.—4
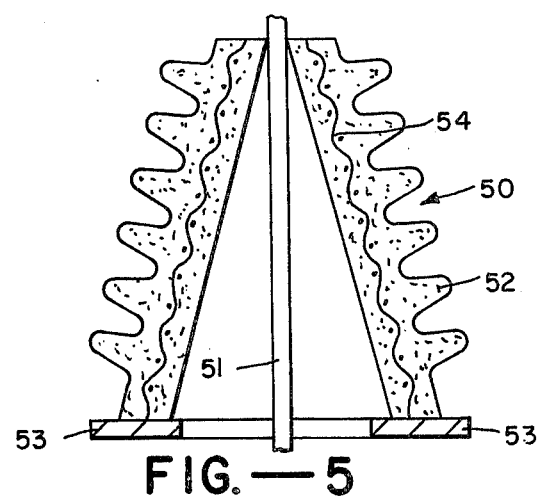
FIG.—5

FILLED POLYMER ELECTRICAL INSULATOR

BACKGROUND OF THE INVENTION

The present invention relates to various forms of filled polymer electrical insulators which are resistant to tracking caused by high voltage.

Electrical insulators are commonly formed of porcelain. This material is subject to a number of disadvantages. It is (a) energy intensive, (b) unsuitable for encapsulating, or attaching metal hardware, (c) brittle, (d) subject to fracture in dangerous sharp flying pieces, (e) difficult to form in close tolerances, and (f) requires expensive processing equipment, i.e., high firing temperature kilns.

In order to overcome the above disadvantages, the prior art also discloses forming electrical insulators from a variety of polymers including polyesters or epoxy resins incorporating fillers, hydrated alumina particles, for the purpose of providing resistance of the structure to carbon tracking due to arcing at high voltage. A maximum suggested amount of this type of filler is on the order of 70%. U.S. Pat. No. 4,001,128 suggests that such water of hydration of the alumina evaporates to produce a porosity which is stated to be reduced by the inclusion of a minor portion of silica treated with silane. Such patent discloses the use of extremely fine grades of alumina and silica.

A major portion of the cost of insulators of the filled polymer type is the resin binder. However, apparently it was believed that the amount of inert filler could not be increased to a significantly higher level without degrading the product. This may be the reason why such filled polymers have not received wide acceptance as electrical insulators.

SUMMARY OF THE INVENTION AND OBJECTS

The present invention provides electrical insulation material including 85 to 97% of non-conductive inorganic inert non-porous filler particles, preferably silica, bound together with 3 to 15% of adhesive resin binder. Preferred proportions are from 88 to 95% by weight of filler. Products of this type are characterized by extremely high mechanical and dielectric strength. Such high loading is possible due to the use of appropriate resin precursors which are sufficiently flowable at such high loadings and also by grading the filler particles to provide a low void space.

It is a general object of the present invention to provide an inexpensive electrical insulation body with superior mechanical and dielectric strengths.

It is a particular object of the invention to provide a body of the foregoing type comprising a high level of inorganic filler particles and a low level of resin binder.

It is a further object of the invention to provide a body of the above type capable of withstanding high voltages without tracking.

It is a further object of the invention to provide such a body which is easily molded to a desired configuration even in large masses and which sets rapidly under relatively low levels of energy.

Other objects and features of the invention will be apparent from the following description of the preferred embodiments taken in conjunction with the appended drawings.

BRIEF DESCRIPTION OF THE DRAWINGS

FIG. 1 is an expanded schematic cross-sectional view of the filled polymer of the present invention.

FIG. 2 is a capacitively graded electrical insulator body according to the present invention with imbedded attachments and conductive plates.

FIG. 3 is an embodiment of a capacitively graded insulator body according to the present invention with a core including conductive particles.

FIG. 4 is a resistive voltage grading device incorporated in an insulation body formed in accordance with the present invention using discrete resistive elements.

FIG. 5 is an electrical bushing shell with an imbedded webbing and incorporating an insulation body in accordance with the present invention.

DETAILED DESCRIPTION OF THE PREFERRED EMBODIMENTS

In general, the present invention relates to a variety of electrical insulation bodies formed of a polymer matrix binding a high proportion of filler particles. Such particles are intimately mixed with adhesive resin precursive binder in a flowable state and formed, generally by molding, into the configuration of the desired electrical insulator body. Then the binder is solidified to form the insulator body in which the binder is adhesively bonded to said filler particles.

As defined herein, the term "insulator body" refers to an entire integral body of filled polymer according to the present invention or a body including the same in combination with other elements such as conductive or semi-conductive material, e.g., for use in a capacitive voltage grading body including alternating layers of semi-conducting material and non-conducting material.

Unless specifically designated to the contrary herein, the term "filled polymer" shall refer to the highly loaded polymeric product used to form the insulator body of the present invention.

Referring to FIG. 1, a schematic expanded cross-sectional view is illustrated of a portion of a filled polymer body 11 according to the present invention. The body includes graded filler particles including relatively large sized particles 12, intermediate-sized particles filling void spaces among particles 12, and fine particles 13 filling smaller void spaces. Resinous adhesive polymer binder binds the graded filler particles together into an integral structure.

Important features of the invention are the loading of the polymer with inert filler at levels previously disregarded in the electrical insulator field together with the unexpected advantages obtained by such high loading. Such advantages include extraordinary increases in mechanical and dielectric strengths in comparison to lower filler particles. Also, faster setting times are possible thereby reducing manufacturing costs because there is a reduction in the exothermic heat produced due to the lower proportion of resin and the ability for heat absorption of such exothermic heat by the higher proportion of inert filler material.

A suitable filler material is characterized by chemical inertness and is essentially electrically non-conductive. Furthermore, it should be nonporous to prevent void spaces which could result in porosity of the final product which leads to significant reductions in mechanical strength and electrical properties. It has been found that inexpensive silica based filler is particularly effective for purposes of the present invention. Such fillers include silica-based rocks, sand and very fine silica flour. However, other inert, inorganic, nonporous filler particles may also be employed such as the more expensive alumina.

It is important to grade the foregoing filler particles in nonhomogeneous mesh sizes ranging from coarse to fine to provide maximum compaction so that the loading levels as set forth below in the filled polymer may be obtained. It is known that a wide distribution of particle sizes provides the highest compaction of particles. Expressed in another way, a variation in the particle size permits the finer particles to fill the void space among the larger particles to reduce the void space. For example, excellent products have been formed in which the filler includes the following mix: (a) relatively coarse particles, e.g., a major portion of which will pass a No. 20 but not No. 40 mesh sieve, (b) intermediate size particles, e.g., only a minor portion will be retained on a No. 40 mesh sieve screen, (c) a finer grade, say, 90% passing a No. 60 mesh sieve screen but not a 400 mesh sieve screen, and (d) very fine particles, say of the size of silica flour, the major portion of which passes a 400 mesh sieve screen. All sieve numbers herein refer to the U.S. standard series. Referring to a particular filler system, component (a) is a rock designated 2Q ROK supplied by Pennsylvania Glass Sand Corp., component (b) is a rock designated No. 1 Dry, component (c) is Berkeley fines, and component (d) is silica flour designated EFJ sand. The sieve analyses of these silica products are set forth in the following table:

TABLE I

SIEVE ANALYSIS OF FILLER PARTICLES

| Sieve No.* | | 2Q ROK % by Wt. | #1 DRY % by Wt. |
|---|---|---|---|
| | +20 | 1.22 | 0.030 |
| −20 | +40 | 90.14 | 25.06 |
| −40 | +60 | 8.49 | 47.16 |
| −60 | +80 | 0.12 | 17.19 |
| −80 | +100 | 0.005 | 4.06 |
| −100 | +120 | 0.006 | 3.03 |
| −120 | | 0.007 | 2.55 |
| −140 | | — | 0.93 |

| Sieve No. | | Berkeley Fines % by Wt. | EFJ Sand % by Wt. |
|---|---|---|---|
| | +60 | 5.50 | — |
| −60 | +80 | 9.30 | — |
| −80 | +100 | 6.02 | — |
| −100 | +120 | 9.89 | — |
| −120 | +140 | 7.85 | — |
| −140 | +170 | 12.39 | — |
| −170 | +200 | 10.95 | 0.11 |
| −200 | +230 | 5.95 | 0.33 |
| −230 | +270 | 7.97 | 0.90 |
| −270 | +325 | 9.95 | 3.05 |
| −325 | +400 | 5.06 | 8.27 |
| −400 | | 9.07 | 87.27 |

*— denotes "passing through"
+denotes "retained on"

Suitable filler particles have a gradation varying from as large as 25 mm nominal diameter to as small as 1 micron or less with over 50% of said filler particles having a nominal diameter in excess of 0.3 mm and preferably in excess of 0.6 to as high as 1 mm or more. One object of these gradations is to produce minimum void space and, thereby, reduce the amount of binder required to fill the void space. Thus, the gradation may be defined in terms of the void space remaining in a mixture of such particles. As set forth below, the filled polymer of the present invention includes at least 85 parts by weight to as high as 97 parts by weight of inorganic filler. As an approximation, it is assumed that the filler particles and polymer have approximately the same specific gravity. Accordingly, the void space of the particles is a maximum of about 15% and preferably below 12% to as low as 3%. This is accomplished by thoroughly dry-mixing all grades of the particles so that they become intimately dispersed with the smaller particles filling the void spaces among the larger ones.

Maximum compaction or loading is assisted by using particles of highly irregular shapes. It is preferable to grind most of the filler particles for this purpose.

The filled polymer includes a loading of filler particles of from about 85% to as high as 98% by weight. Excellent results are obtained in the range of from 88% to 95% by weight. It was unexpected that the insulator bodies could be loaded to such a high degree and that significant improvements in properties could be obtained.

One advantage of such high loading with filler particles is a significant reduction in the raw material cost of the product. In addition, the mechanical and dielectric strengths of the product are significantly increased. Furthermore, such products are capable of being cast in greater bulk than the resins filled with lower amounts of filler particles. This is because there is less exothermic heat produced due to the lower percentage of resin and also the ability of the higher percent of inert filler material to rapidly absorb such exothermic heat. This also permits faster setting times of the material thereby reducing the manufacturing costs.

Another advantage of the highly filled polymer for use as an electrical insulation body is that its thermal coefficient of expansion may be selected to match that of conductors and bushings and metallic end caps which can be integrally cast into the composite structure without the necessity of a costly additional step of first forming the casting with a recess and then adhesively bonding such metallic parts to the insulation. The importance of the matching thermal coefficients of expansion is that at elevated temperature, there is no tendency of the metal and polymer to expand at different rates. It has been found that the silica filled products of the present invention have thermal coefficients of expansion similar to that of copper, important as an electrical conductor.

The ability to load at the above levels is due in part to the foregoing grading of particles. Also, the polymers are selected to be sufficiently flowable during formation of the filled insulator body to permit thorough mixing and coating into thin films of the polymer binder.

For this purpose, the polymer resin precursive binder should be at a relatively low viscosity during forming. Suitable forming viscosities are below 150 centipoise (cps), and preferably from 1 to 50 cps or less.

A wide variety of thermosetting and thermoplastic resins may be employed as the binder in accordance with the present invention. One requirement of such resins is that they are capable of being formed into an adhesive resin precursive binder which is sufficiently flowable or of low enough viscosity to form the thin films necessary for binding the fillers at such high loadings. It is apparent that without this ability to spread into a thin film, the amount of polymer required to bind adjacent particles would be increased to a level significantly greater than required to fill the void space among the particles. In general, the binder may comprise one or more thermoplastic polymers or copolymers, one or more thermosetting polymers or copolymers or mixtures of the two.

Formation of the filled polymer using a thermosetting resin is accomplished by polymerizing such resin in situ from either its monomer or partially polymerized polymer. Particularly effective thermosetting resins include polyesters, furanes and alkyl acrylonitriles (particularly butyl acrylonitrile). A suitable furane is formed by the polymerization of furfural alcohol, an inexpensive byproduct derived from an agricultural base.

Conventional polyester resins may be employed such as described in the chapter entitled "Polyesters" by Edward H. Meyer, *Modern Plastics Encyclopedia*, September, 1964, pp. 235–240 and references cited therein, and "Polyesters and Their Applications" by Bjorksten et al, Reinhold, New York, 1956.

Suitable castable polyesters comprise a solution in styrene of the esterification product of a glycol, such as propylene glycol and dibasic acids. Such monomer systems are characterized by viscosities as low as 30 cps. The dibasic acids include phthalic anhydride, or isophthalic acid and maleic anhydride. When properly catalyzed with a peroxide, the styrene reacts with the unsaturated maleic groups to form the thermoset resin. Only small amounts of catalyst, in the range of 0.5 to 1.0%, are employed.

Thermosetting resins, such as epoxy resins, have been employed at lower filling levels because such resins are characterized by high structural strengths. However, they are not preferable in the present invention because of their high viscosity and cost without providing the desired corresponding dielectric strengths.

Thermoplastic materials may also be employed as the binder of the present invention. Excellent results have been obtained with acrylics including polymethyl methacrylate. Other thermoplastic materials such as polystyrene may also be employed.

Thermoplastic polymers are more versatile than thermosetting polymers in that they can be used in a flowable state either prior or subsequent to polymerization. Thus, they may be prepolymerized and heated for formation into a flowable state. Alternatively, they may constitute a polymerizable resin precursor similar to the thermosetting resins in the form of monomer or a partially polymerized polymer.

Other thermoplastic materials may also be employed so long as the ultimate strength requirements are not too high and the temperatures of application do not exceed the softening point of the polymers.

It has unexpectedly been found that the highly loaded filled polymer of the present invention displays extraordinary properties in comparison to ones containing lower filler levels. For example, polyesters with low filler levels tend to react to arcing at high voltages which cause the formation of carbonaceous deposits in an electrical insulator which ultimately result in low resistance paths, or tracks, that cause electrical failure of the apparatus. However, at the high loadings of the present invention, the filled polyesters are essentially track resistant. With respect to mechanical strength, acrylics have been considered too weak for wide scale use as insulators. However, at the high loadings of the present invention, there is an extraordinary increase in structural strength rendering them particularly adapted for such use.

It is believed that the basis for the extraordinary increases in both dielectric and structural strengths of the present invention is the very thin resinous films which bind the filler particles. Such thin films are formed because of the use of relatively large particles, high loading, and irregular shapes. In the preferred size ranges (over 50% of the particles having a nominal diameter in excess of 0.3 mm) and at such high loadings, the polymer binder of necessity forms thin films. It is well recognized that insulating material show a significantly higher dielectric strength per unit thickness in a thin film as opposed to thick cross-sections by several orders of magnitude. This is a logical reason for such high dielectric strengths. The theory for the high mechanical strengths is based upon the mechanism of failure in resins. That is, such failures generally occur by crack propagation through the material. The presence of extremely high loadings of filler materials create barriers which impede the path of such crack propagation, thereby increasing the structural strengths of the materials.

Conventional catalysts and accelerators may be employed for the polymerization reactions of the present invention. Thus, for the methyl methacrylate system, benzoyl peroxide may be used as a catalyst while dimethyl aniline and dimethyl toluedine may be used as accelerators. Similarly, for the polyester system, methylethyl ketone peroxide may be used as a catalyst while cobalt naphthanate may be used as an accelerator.

The mixing technique for formation of the filled polymer of the present invention is described in general terms as follows. The first step is to dry blend the filler particles for sufficient time to assure intimate dispersion. Then, the fluid resin precursor binder together with its catalyst and accelerator are added as a mixture to the preblended particles. Then, the mixing is continued for, say, several minutes until all filler particles are adequately wetted by the binder. Typical total mixing times may be on the order of 5 minutes.

A particularly effective means for thorough mixing is to employ a vibratory-type mixer which provides a rapid, random and thorough mixing action. This is particularly helpful when the viscosity of the mixture is increased, say, by the addition of fiber reinforcing agents described below. One suitable type of mixer comprises a deformable rubber bowl and a wobble plate attached to it which imparts varying velocities and accelerations up to 10 times the force of gravity to the particles and binder contacting it. One type of mixer of this type is designated the Omni mixer (Gar-Brothers, Los Angeles, Calif.).

After mixing, the filled resin is placed into a mold in the form of the desired electrical insulator body. After filling, it is helpful to vibrate the mold to consolidate the composite and expel entrapped air. After the completion of vibration, the mold may be retained in a stationary form for gelling and curing at ambient temperature. It is desirable to provide essentially void-free castings. This may be accomplished by vibration of sufficient amplitude and frequency for this purpose while maintaining a vacuum on the material. However, where large castings are employed and the working time of the filled polymer mixture does not facilitate prolonged vibrations, such vibration may be combined with the simultaneous application of a vacuum alternated with atmospheric pressure to obtain void free casting within a relatively short period of time. It is noted that the presence of voids tend to degrade dielectric performance of the filled polymer, especially with respect to corona inception.

A suitable simultaneous vibration and vacuum technique might be carried out as follows. Initial consolidation is performed by vibration and simultaneously applying a vacuum of, say, 30 mm of mercury for approximately 30 minutes. During this time, the pressure is alternated between the vacuum and atmospheric pressure several times to cause the material in the mold to heave and slump, thus facilitating evacuation and elimination of the voids. When this has been accomplished as observed visually, the vibration vacuum treatment is discontinued and the polymer concrete permitted to gel and cure.

For specific applications, additional structural strength may be desirable. For this purpose, conventional inert electrically non-conductive fibrous fillers may be employed including chopped alkali-resistant glass or organic aramid fibers such as sold under the trademark "Kelvar 29 and 49". The glass fibers are typically used at levels from approximately 2 to 4% by weight of the polymer while the aramid or other organic fibers are at levels comprising less than 1% by weight.

For specialty applications, other types of fillers may be employed such as fabrics or cloths woven of similar fibers to the chopped fibers of the preceding paragraph. Embedding such woven fabric in the product renders it shatter-resistant, a safety factor where the product is subjected to high pressure. Both the chopped fibers and the woven fibers are imbedded in the filled polymer while the resin is in a flowable state and are retained during solidification to form an integral part of the polymer structure.

It has been found that the bond between the inorganic filler particles, particularly silica-based ones, and the polymer binder can be made stronger by the use of conventional silane coupling agents. In this instance, the coupling agent is first coated on the particles prior to mixing with the polymer. The silanes set forth in U.S. Pat. No. 4,001,128 are suitable for this purpose.

The filled resin product of the present invention is characterized by extraordinary dielectric and mechanical strengths. Thus, it possesses a dielectric strength of at least 800 V/mil to as high as 1200 V/mil; a compressive strength of at least 20,000 psi and as high as 40,000 psi; a tensile strength of at least 2,500 psi to as high as 3,400 psi and a flexure strength of at least 8,500 psi.

The insulator body of the present invention is readily molded at close tolerances to many desirable forms such as set forth in the drawings. Referring to FIG. 2, a capacitive voltage grading device is illustrated including alternating semi-conductive and non-conductive layers, the latter ones of which are the filled polymer of the present invention. The capacitive grading body 21 is molded of filled polymer 22, and includes a metallic mounting pod 23 with an imbedded spool portion 24. Aligned metal spools 25-27 are imbedded into the voltage grading device and arranged in series with the flat bottom surface of one spool spaced from an adjacent flat top surface of the next spool. Voltage grading is effective for both 60 hz and impulse lightening strokes.

FIG. 3 is a resistive voltage grading device 30 molded of filled polymer 31 including imbedded metallic mounting pods 32 and 33. A semi-conductive core 34 is incorporated into filled polymer 31 extending through the center of the insulator. It preferably is formed by embedding conductive particles such as graphite in the filled polymer prior to setting.

Referring to FIG. 4, another resistive voltage grading device 40 is illustrated including mounting pods 41 and 42 and imbedded discrete parallel-series resistors 43 in filled polymer 44. Current flow is restricted to approximately 2 mA to effect voltage grading uniformly across the insulator at 60 hz.

Referring to FIG. 5, an electrical bushing shell 50 is illustrated including an axial conductor 51 and an external annular bushing shell 52 formed of filled polymer of conical shape supported by a cylindrical annular disc-like metal flange 53. Inside the bushing shell is a defined gas under pressure. A reinforcing material 54 is imbedded in the interior of shell 50 and extends around the entire shell. This reinforcing material may be in the form of a stranded or webbed fabric or cloth of non-conducting material such as glass fibers or organic fibers as described above. The purpose of this material is to prevent explosion and expulsion of fragments.

The foregoing materials are also useful as an insulation body and any other area of transmission and distribution of electrical power. It is a particularly effective replacement for conventional porcelain insulators in that it is many times cheaper to construct but does not require the massive energy input of firing porcelains. Also, discrete bodies such as conductors and mounting elements can be imbedded in the filled polymer to form bonds without a costly extra adhesion step.

A further disclosure of the nature of the present invention is provided by the following specific examples of the practice of the invention. It should be understood that the data disclosed serve only as examples and are not intended to limit the scope of the invention.

EXAMPLE 1

A filled polymer of styrenated polyester is formed with the following raw materials:

| Material | Approximate Weight % |
| --- | --- |
| Sand (90% passing No. 20 sieve) | 45 |
| Sand (25% passing No. 20 sieve) | 14 |
| Sand (95% passing No. 60 sieve) | 7 |
| Silica Flour | 22 |
| Polyester premix (B304-60) | 9 |
| Styrene | 2 |
| Accelerator (Cobalt Napthenate) | 0.10 |
| Catalyst (MEKP) | 0.10 |
| Silane (A-174) | 0.10 |
| Inhibitors for extending process time (5% hydroquinone) | 0.05 |

The silica filler is thoroughly dry blended and then mixed with the remainder of the ingredients to shear the composite mixture sufficiently to essentially expose all material to binder. Mixing is performed in a vibratory-type mixer designated an Omni mixer (Gar-Brothers, Los Angeles, Calif.). After completion of mixing, the product is removed from the mixer and subjected to a vibration vacuum technique to form a void free casting. In this technique, initial consolidation is accomplished by first vibrating the mold followed by application of a vacuum of about 30 mm of mercury maintained for approximately 30 minutes. During this time, the pressure is alternated between vacuum and atmospheric pressure several times causing the material in the mold to heave and slump and thus facilitating evacuation and elimination of voids.

A product formed by the above technique is characterized by the properties set forth in the following table:

TABLE II

| | |
|---|---|
| Dielectric constant, 60 Hz, R.T. (dry) | 4.5–4.9 |
| Dielectric strength (⅛ inch) | 450 V/mil |
| Dissipation factor, 60 Hz, R.T. (dry) | 1.10%–1.35% |
| Arc resistant, ASTM D-495 | 250 seconds |
| Specific Heat | 0.20 Btu/lb °F. |
| Compressive strength (3 in. dia. × 6 in. ht.) | ~22,000 psi |
| Flexural strength (2 × 2 × 10 in. beams) | ~6,000 psi |
| Coefficient of thermal expansion (dry, 25° C.) | $20 \times 10^{-6}$ in/in °C. |

EXAMPLE 2

A product of the foregoing type was coated with a silica coating provided by Sierracin Corporation, Sylmar, Calif., which is a proprietary abrasion resistant coating type Sierracote 311. The technique was as follows. Dipping of the insultor into the coating liquid after solvent cleaning and rotating under a heat lamp at 90° C. for 45 minutes.

The foregoing product was characterized by dielectric constants and dissipation factors set forth in the following table:

TABLE III
DIELECTRIC CONSTANT AND DISSIPATION FACTOR (60 Hz, R.T.)

| History* | Dielectric Constant | Dissipation Factor |
|---|---|---|
| Initial measurement after application of coating | 4.5 | 0.014 |
| AFter drying at 120° C. for 24 hours to expel absorbed moisture | 4.5 | 0.011 |
| After exposure to 50% R.H. environment to 72 hours | 4.5 | 0.014 |
| After exposure to 50% R.H. environment for 168 hours | 4.5 | 0.013 |
| After exposure to 96–98% R.H. environment for 30 days | 4.5 | 0.028 |
| After drying at 120° C. for 24 hours | 4.5 | 0.011 |

*Note:
All the events described above under History took place in sequence.

EXAMPLE 3

A product of the following composition was formed in accordance with the method of Example 1. The loading was 90% by weight filler and 10% by weight binder component.

| Filler (Aggregate) | Binder Component |
|---|---|
| Silica (2Q ROK) 36% | Methyl methacrylate 8.5% |
| Silica (White Sand)* 24.3% | Monomer X-980 0.9% |
| Silica Berkeley Fines 7.2% | Organosilane ester (A174-Union Carbide) 0.1% |
| Silica Flour (EFJ) (1924-1 Silica) 22.5% | Benzoyl Peroxide 0.3% |
| | N-N-Dimethyl-p-Toluidine 0.2% |

*approximately the same size as 2Q ROK

A body formed by the above technique is characterized by the properties set forth in the following table:

TABLE

| | |
|---|---|
| Compressive Strength | 14,785 psi |
| Tensile Strength | 1,510 psi |
| Dissipation Factor | 0.014 |
| Dielectric Constant | 4.5 |
| Accelerated Life Test in Fog Chamber | = 125 Hours at 12 kv with 0.05% salt concentration |

What is claimed is:

1. A track resistant electrical insulation filled polymer body comprising an intimate mixture of about 85 to 97 weight % of essentially electrically non-conductive inert nonporous inorganic filler particles including a major portion of silica, and 3 to 15 weight % of a resinous adhesive polymer binder bonding said filler particles together into an integral structure, said particles being graded in nonhomogeneous sizes including at least four different grades to maximize loading, over 50% by weight of said filler particles being characterized by a nominal diameter in excess of 0.3 mm, said polymer being formed from a monomer comprising methyl methacrylate characterized by a viscosity less than 150 cps at room temperature.

2. The insulation body of claim 1 characterized by a dielectric strength of at least 400 V/mil.

3. The insulation body of claim 1 characterized by a compressive strength of at least 20,000 psi.

4. The insulation body of claim 1 characterized by a tensile strength of at least 1,500 psi.

5. The insulation body of claim 1 including a coupling agent forming covalent bonds between said inorganic filler particles and said polymer binder.

6. The insulation body of claim 1 including an imbedded electrical conductor extending from the same.

7. The insulation body of claim 1 including reinforcing electrically non-conductive organic or glass fibers dispersed therein.

8. The insulation body of claim 1 which is essentially pore-free.

9. The insulation body of claim 1 including an embedded woven fabric formed of electrically non-conductive fiber.

10. The insulator body of claim 1 together with a plurality of conductive particles in said filled polymer aligned to form a semi-conductor core in said body.

11. The insulation body of claim 1 in which said polymer binder comprises methylmethacrylate.

12. The insulation body of claim 1 in which said filler particles consist essentially of silica.

* * * * *